(12) United States Patent
Higbie

(10) Patent No.: US 9,387,389 B2
(45) Date of Patent: Jul. 12, 2016

(54) GAMING CARDS AND METHOD FOR USE AND DISTRIBUTED NETWORK GAMING MANAGEMENT

(71) Applicant: Colin Higbie, Orange, NH (US)

(72) Inventor: Colin Higbie, Orange, NH (US)

(*) Notice: Subject to any disclaimer, the term of this patent is extended or adjusted under 35 U.S.C. 154(b) by 209 days.

(21) Appl. No.: 13/922,491

(22) Filed: Jun. 20, 2013

(65) Prior Publication Data

US 2014/0004921 A1    Jan. 2, 2014

Related U.S. Application Data

(63) Continuation of application No. 11/917,612, filed on Dec. 14, 2007, now abandoned.

(51) Int. Cl.
| | |
|---|---|
| A63F 1/02 | (2006.01) |
| A63F 13/30 | (2014.01) |
| A63F 13/75 | (2014.01) |
| A63F 9/06 | (2006.01) |

(52) U.S. Cl.
CPC . *A63F 1/02* (2013.01); *A63F 13/12* (2013.01); *A63F 13/75* (2014.09); *A63F 2009/0616* (2013.01)

(58) Field of Classification Search
USPC .......................................... 273/236, 296, 304
See application file for complete search history.

(56) References Cited

U.S. PATENT DOCUMENTS

| | | | |
|---|---|---|---|
| 2,138,524 A | 11/1938 | Harkins | |
| 2,652,635 A * | 9/1953 | Conger | 434/345 |
| 2,984,018 A | 5/1961 | Coleman, Jr. | |
| 3,411,221 A | 11/1968 | Clark | |
| 4,544,836 A | 10/1985 | Galvin et al. | |
| 5,219,172 A | 6/1993 | Laughlin et al. | |
| 5,435,568 A * | 7/1995 | Black | 273/303 |
| 6,412,779 B1 | 7/2002 | Kenney | |
| 6,554,702 B2 | 4/2003 | Mahar et al. | |
| 2002/0155869 A1 | 10/2002 | Soltys et al. | |
| 2003/0094759 A1 | 5/2003 | Niedner et al. | |
| 2005/0221198 A1 | 10/2005 | Takizawa et al. | |

* cited by examiner

*Primary Examiner* — Melba Bumgarner
*Assistant Examiner* — Amir Klayman
(74) *Attorney, Agent, or Firm* — Hayes Soloway PC

(57) ABSTRACT

A gaming system allows a game manager to manage and run a multiplayer game and adjudicate all player characters with the ability to control the game and game play for all players from a centralized command facility in real-time. Interactive cards can be used that relate to investigated objects. The cards include information relating to the usage of the discovered objects as well as provide a method whereby the cards can interact based on predetermined orientation(s). Furthermore, an object discovery and investigation methodology is outlined that provides characters with a roadmap for determining the consequences of interaction with an object.

4 Claims, 10 Drawing Sheets

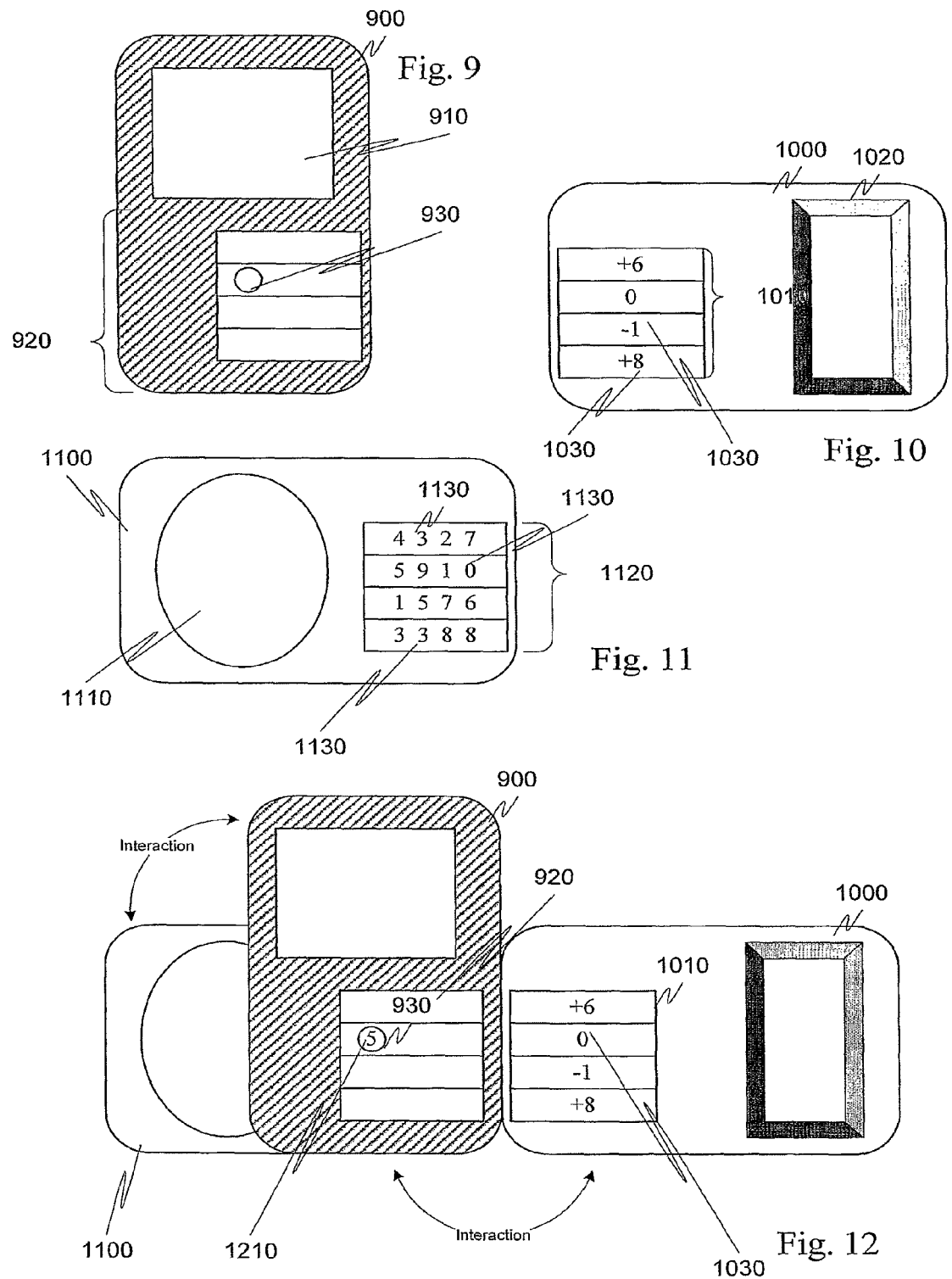

GAMING CARDS AND METHOD FOR USE AND DISTRIBUTED NETWORK GAMING MANAGEMENT

CROSS REFERENCE TO RELATED APPLICATIONS

This application is a continuation of U.S. application Ser. No. 11/917,612 filed Dec. 14, 2007, which claims the benefit of PCT Application Serial No. PCT/US06/23537, filed Jun. 16, 2006, which claims the benefit of and priority to U.S. Provisional Application No. 60/690,888 filed Jun. 16, 2005 all of which are incorporated herein by reference in their entireties.

BACKGROUND

Field of the Invention

Role playing games (RPG's) are games in which players typically assume the role of characters and work in collaboration through a series of challenges in an imaginary world. Game play is governed by a set of rules and within the bounds of those rules, players can regulate and direct the direction of the game. For example, rules such as those in the open d20® SRD, (System Reference Document, by Wizards of the Coast®) or the d20 3 or 3.5 versions of the "Players Handbook" or "The Dungeon Master's Guide" also by Wizards of the Coast, which are incorporated herein by reference in their entirety, can be used as a basis for governing game play. It is to be appreciated that in general however any rules, rule set or attributes can be used with this invention. Also, any references to SRD may also refer to the Players Handbook or The Dungeon Master's Guide.

These rules, or game mechanics as they are commonly known, typically require oversight by a game master or game manager who manages one or more game sessions and acts as the arbitrator for rules interpretation. In addition to a game manager, participants play inhabitants of the game setting known as "player characters" which, due to the collaborative nature of role playing games, typically form into a party. In addition to player characters, a game environment typically includes non-player characters that are also present in the gaming world and are typically controlled by the game manager. A typical game session contains activities such as negotiation, puzzle solving, investigating objects, combat, wealth management, confrontation, or the like. To determine the outcome of any one or more of these actions, the games typically use weighted statistics and dice rolls to decide the outcome of a particular action.

While the majority of role playing games are more traditional pen and paper type games, there also exist computer-assisted role playing games and internet role playing games that can range in complexity from simple text-based games to graphically intensive games to massive multiplayer on-line real-time role playing games (MMORPG's).

SUMMARY

Exemplary aspects of this invention relate to gaming. More particular aspects of the invention relate to modeling or simulating the investigation of complex objects, such as objects or artifacts with consequences based on the investigation.

Further exemplary aspects of the invention relate to interactive cards that relate to the investigated objects. These cards include information relating to the usage of the discovered object(s) as well as provide a method whereby the cards can interact.

Still further aspects of the invention relate to a gaming system allowing a game manager to manage and run a game and adjudicate all player characters with the ability to control the game and game play for all players from a centralized command facility.

Another exemplary aspect of this invention relates to an on-line computer-based role-playing game with a game manager, which is a real person, that can oversee and perhaps even cooperate with, computer-based game management.

For example, typical on-line computer role-playing games are played in a virtual world where all play is managed by computer-based rules and actions either allowed or disallowed based on a computer's determination of whether the action is within the rule set.

Aspects of the invention thus relate to human managed game play in a networked computer environment.

Additional exemplary aspects of the invention relate to on-line game creation, management, modification and adjudication by a game manager.

Still further aspects of the invention relate to providing the necessary tools, rules and game playing management tools to allow a game manager to regulate an on-line game having one or more players.

Additional exemplary aspects of the invention relate to interactive playing cards.

Further exemplary aspects of the invention relate to interactive playing cards having one or more windows therein, the windows allowing information on adjacent cards to be viewed through the window.

Still further aspects of the invention relate to interactive playing cards having a first, generalized set of information on a first side, and a second, specific set of information on a second side.

Yet another exemplary aspect of the invention relates to a business model wherein a business licenses to individual game managers a copy of software, and then those game managers find players to play player characters in their virtual world, controlled through the Game Manager software system defined herein, and charge those players to play, a portion of the payment being collected by, for example, the licensing business that owns the software.

These and other features and advantages of this invention are described in, or are apparent from, the following detailed description of the exemplary embodiments.

BRIEF DESCRIPTION OF THE DRAWINGS

The exemplary embodiments of the invention will be described in detail, with reference to the following figures, wherein:

FIG. 9 illustrates an exemplary interaction card according to this invention;

FIG. 10 illustrates exemplary cross-interaction card according to this invention;

FIG. 11 illustrates an exemplary interaction card according to this invention;

FIG. 12 illustrates exemplary interaction between a plurality of interaction cards and a cross-interaction card according to this invention;

DETAILED DESCRIPTION

Figure 1:
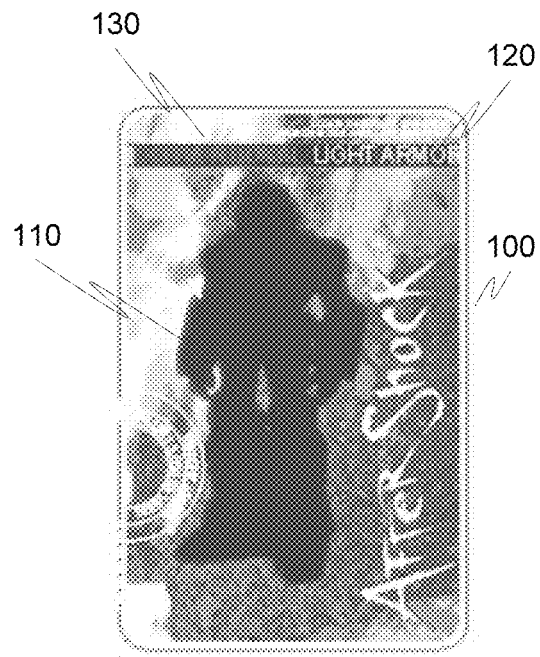
FIG. 1 illustrates an exemplary interaction card according to this invention.

The exemplary systems and methods of this invention will be described in relation to role-playing games. However, to avoid unnecessarily obscuring the present invention, the following description omits well-known structures and devices that may be shown in block diagram form, are generally known, or are otherwise summarized. For purposes of explanation, numerous specific details are set forth in order to provide a thorough understanding of the invention. It should however be appreciated that the present invention may be practiced in a variety of ways beyond the specific details set forth herein.

Furthermore, while the exemplary embodiments illustrated herein show the various components of the system collocated, it should be appreciated that the various components of this system can be located at distant portions of a distributed network, such as a LAN and/or the Internet, or within a dedicated network. Thus, it should be appreciated that the components of this system can be combined into one or more devices or collocated on a particular node of a distributed network, such as a communications network. It will be appreciated from the following description, and for reasons of computational efficiency, that the components of the system can be arranged at any location within a distributed network without affecting the operation of the system.

Furthermore, it should be appreciated that the various links connecting the elements can be wired or wireless links or any combination thereof, or any other known or later developed element(s) that is capable of supplying and/or communicating data to and from the connected elements. These wired or wireless links can also be secure links and are capable of communicating encrypted or otherwise secured information.

The term module as used herein can refer to any known or later developed hardware, software or combination of hardware and software that is capable of performing the functionality associated with that element. Also, while the invention is described in terms of exemplary embodiments, it should be appreciated that individual aspects of the invention can be separately claimed. While all the embodiments discussed herein will be directed toward a specific sequence of operations, it should be appreciated that the sequence can be varied as appropriate.

"Artifact," as used herein in relation to the given examples will generally refer to an object or device that is not readily understood by or familiar to a character.

Exemplary aspects of the invention relate to the use of interactive cards in a role-playing game. These interactive cards can represent various objects such as armor, weapons, or in general, any object that can be encountered during game play. For example, and in addition to simple objects, the interactive cards can represent special items with specific powers which can sometimes be complicated and difficult to use. This complexity and difficulty can be manifested in game terms through a series of investigations or use checks that only certain characters are likely to be able to perform successfully.

The interactive cards can also include windows that when placed in a certain orientation relative to another interaction card reveals special codes through the window. These codes, i.e., interaction data, relate to how the cards interact and, for example, how the objects represented by the cards interact. For example, if one interactive card is a weapon, and the other interactive card armor, the effectiveness of the weapon against another wearing the armor can be seen when the two cards are combined and the interaction data revealed. However, the interaction cards are not limited to a one-to-one correspondence, but multiple cards can be aligned to each other, and through an intersection of multiple windows interaction data revealed. The cards can also be placed, for example, side-by-side, in a two-dimensional relationship, as well as stacked in a three-dimensional relationship.

The interaction cards, with or without the windows, can also be double-sided with information on one side capable of being hidden from, for example, a player, until a triggering event allows the player to flip the card and reveal the other side of the card. For example, during game play, until a character has successfully identified what the card represents, such as an object, artifact, action, medicine, knowledge, etc., the player may only be able to see a first side of the card that has general information. After successfully identifying what the card represents, the player can flip the card, and see exactly what the object is, what special powers it gives to a character (if any) and any other details about the item. This process of investigating objects will be discussed hereinafter in better detail.

FIG. 1 illustrates an exemplary first side of an interaction card 100. As discussed, this first side contains general information which in this case indicates that this card relates to a light armor object. In this exemplary embodiment, rudimentary information about the object is presented such as a rough outline of the object 110, the general category of the object 120 and a classification 130.

Figure 2:
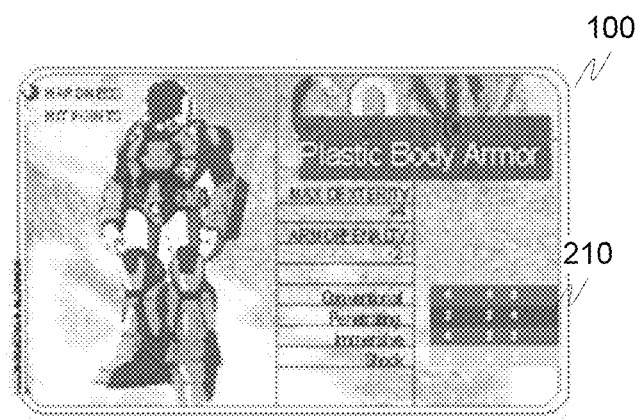
FIG. 2 illustrates an exemplary interaction card according to this invention.

FIG. 2 represents a second side of the interaction card 100 shown in FIG. 1. In this view, more detailed information about the object is given such as, for this particular embodiment, the hardness and hit points of the armor, the specific type of armor, maximum dexterity bonus, armor penalty for skill checks, as well as interaction data 210 that, for this particular example, is categorized as conventional, penetrating, immersive and shock. As will be seen from discussions that follow, this interaction data 210 will be used in determining the interaction of the plastic body armor with other objects, such as weapons or events that may occur during game play.

Figure 3:
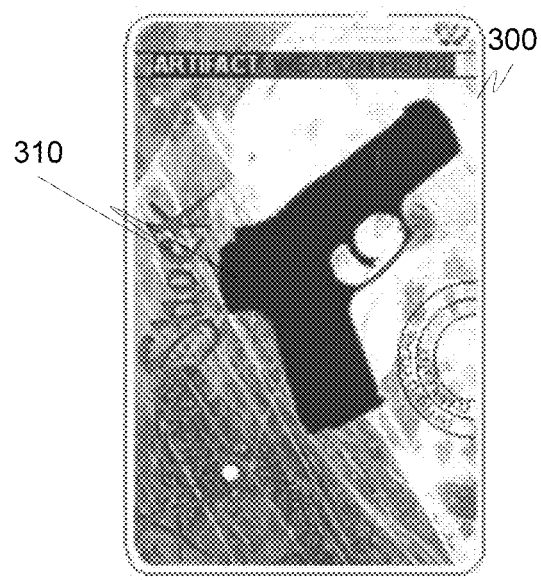
FIG. 3 illustrates an exemplary interaction card according to this invention.
Figure 4:
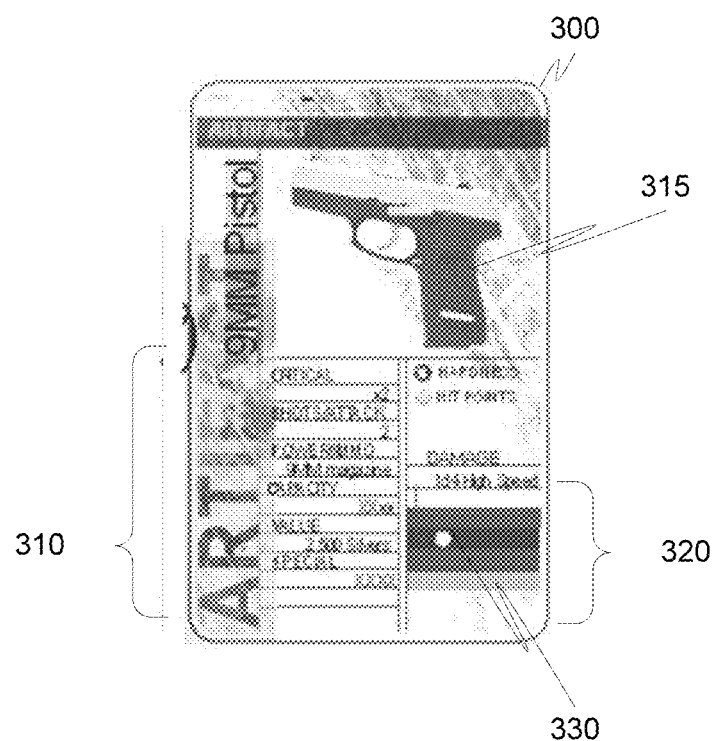

FIG. 3 represents another exemplary interaction card 300 of the general category artifact and the more specific category weapon: pistol. Similar to the interaction card 100, the interaction card 300 includes on a first side a silhouette 310 of the artifact as well as very basic information about the artifact. FIG. 4 represents the opposite side of interaction card 300 and includes more specific information about the weapon, which in this case is a 9 mm pistol. Specifics 310 about the weapon can be included as well as a detailed drawing 315. In addition, in the interaction data area 320, a window 330 can be seen that, when placed over another card reveals interaction data through the window 330. This interaction data that is seen through the window represents the effect the two cards have on one another.

Artifacts investigation is the mechanism by which a player determines whether a player can flip the card over to see the detailed second side. Only after navigating the artifact investigation chart successfully may a player see the opposite side of the card and learn specifics about the newly discovered object. As can be appreciated from the description herein, this general investigation technique can be used for any aspect of gaming.

As an example, a player either knows an object, and how to use it, or does not. Once a character has learned or been taught how to use a given object, such as an artifact, the character can use any identical item immediately and, for example, without penalty.

Taking an artifact as an example, every artifact has a class and a complexity. A class is a category or a general description of the item. An artifact class may include such categories as, for example, handgun, shoulder arm, powered armor, ground vehicle, surgical tool, laptop computer, magic staff, skeleton key lock, etc., or in general anything that can be encountered during game play. If a character has mastered or been taught how to use one artifact of a given class, it can be much easier for the character to figure out how to use other artifacts within the same class. Some artifacts are considered unique with a unique artifact being deemed to be sufficiently different from any other artifact that it may not share a class.

The complexity of an artifact is a measure of how much time, effort, insight, etc., is needed to determine how the artifact works. An axe, for example, is significantly less complex than a submarine. If a character has familiarity with another artifact of the same class, such as another ground vehicle or another handgun, that player may attempt to use the artifact immediately without necessarily fully understanding it. However, there can be risks associated with misusing the artifact. Thus, it may be advantageous for the player to figure out how to use the artifact before trying to use it.

Deducing the function and control for a newly discovered artifact can be a multi-stage process. In general, a character usually needs to find the artifact and the artifact must be in good operational order, if applicable. The player must also know how to use the artifact or take the time investigate and study the artifact. And in accordance with this exemplary embodiment, the player must also make a Use Artifact skill check (sometimes referred to herein as "use object" skill check, see the SRD for a description of "skill check") and no character may determine without ranks (as used in the SRD) in the use artifact skill, although the player may still be able to be taught by someone else who already knows how to use it.

Figure 5:
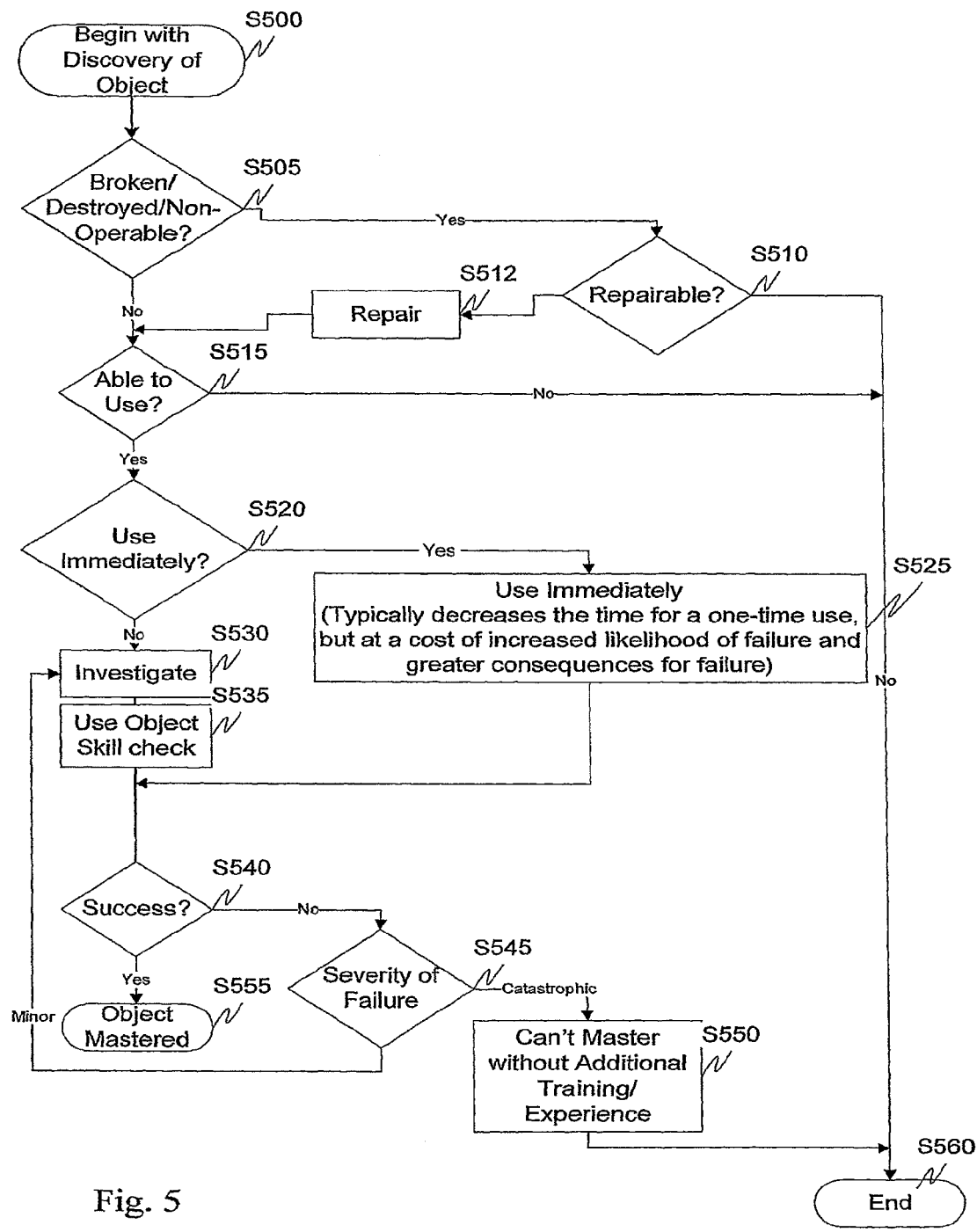
FIG. 5 is a flowchart outlining an exemplary method of object discovery according to this invention.

FIG. 5 outlines an exemplary object discovery methodology according to this invention. In particular, control begins in step S500 and continues to step S505. In step S505, a determination is made whether the object is broken, destroyed or non-operable. If the object is not broken, destroyed and is operable, control continues to step S515. Otherwise, if the object is any of these, control continues to S510 where a determination is made as to whether the object is repairable. If the object is not repairable, control jumps to step S560 where the control sequence ends.

Otherwise, if the object is repairable, control continues to step S512 where the repair is made with control continuing to step S151.

In step S515, a determination is made whether the player is able to use the object. If the player is not able to use the object, control jumps to step S560 where the control sequence ends. Otherwise, control continues to step S520.

In step S520, the character makes a determination whether to use the object immediately, which requires a previous understanding of another object of the same class to lessen the possibility of a catastrophic failure. If the object is to be used immediately, control jumps to step S525 where the object is used immediately.

Otherwise, control continues to step S530 where the object is investigated. Next, in step S535, a use object skill check is performed. Then, in step S540 a determination is made whether the object was successfully used. If the object was successfully used, control concludes in step S555 with the object being categorized as mastered. Otherwise, control continues to step S545 where a determination of the severity of the failure is made.

In step S545, and if the severity of the failure was determined to be minor, after assessing other consequences for failure, control continues back to step S530 for continued investigation.

If the severity of the failure was catastrophic, control jumps to step S550 where the player is informed that the object cannot be mastered without additional training and/or experience. Control then continues to step S560 where the control sequence ends.

The exemplary methodology and specific steps discussed in relation to FIG. 5 can also include greater specificity, based, for example, on specific exemplary game play as outlined below. It is to be appreciated that these specific examples can be modified, supplemented or deleted based on, for example, the particular operational environment.

When a character finds an artifact that is of a class the character has never before mastered, the character has no idea what has been found. The game manager may show a picture of the artifact to the player, but even though the player may recognize a picture of a shotgun, the character may not know what the artifact is. (Note, as used herein "game manager" refers to a person(s) overseeing gaming, and "Game Manager" is the system 1 illustrated in FIG. 20)

The game manager may also, for example, choose to describe the item, helping the player share in the sense that the character has found something mysterious. For example, instead of showing a picture of a shotgun, the game manager could describe it, "The object consists of two black metal tubes with a wooden wedge at one end. The tubes are connected to each other lengthwise. Both tubes are a little less than an inch in diameter. One is three feet long and has an open end. The other end is embedded in the wedge. The second tube, about half the length of the first, is also attached to the wedge, but is sealed with some sort of cap or screw at the opposite end. There is a metal loop with a curved inch-long lever inside it protruding from the short tube near where it connects to the wedge. Near the loop, there is a silver panel about three inches long on the sealed tube. On the open ended tube also near the loop is a similarly sized panel, except this one is black, like the tubes." More details could be given in response to player questions.

If the artifact is the same class as an artifact the character has already mastered, but a new object, e.g., character is familiar with the class "shoulder arms" from a previous experience with a rifle, but has never before seen a shotgun, the game manager can narrate that information to the player. For example, "As you sift through the rubble, you uncover what appears to be a shoulder arm of some sort. It's not like the others you have used." The game manager may also choose to show a picture of the artifact to the player.

Regardless of artifact class, and in accordance with an exemplary embodiment, no character can use any artifact with a DC (Difficulty Class) greater than the total of his Intelligence (as defined in the SRD) plus his Use Artifact skill plus any artifact-related feat bonuses (feats are defined in the SRD). For example, the DPI (a fictional medical device) has a DC of 22. If Varus the barbarian, with an Intelligence of 8 wishes to learn how to use the DPI so he can treat himself during battle, unless he has acquired combined total ranks in Use Artifact and any feat bonuses of 14 or more, he will not be able to use the device.

TABLE 1

Requirements to Use an Artifact

To be able to use an artifact
Int Mod + Use Artifact Skill + Artifact Feat Bonuses > Artifact DC Investigation—In accordance with an exemplary embodiment, only characters with ranks in the Use Artifact skill can investigate an artifact in an effort to master it. To investigate or attempt to use an artifact, the artifact must be in working order (not broken) and have at least enough power for one use.

There are two exemplary alternatives to using an artifact that do not require investigation. Anyone with sufficient Intelligence and insight to use the artifact, according to Table 1 can learn from someone who already knows how to use the artifact (see Teaching Others below). If the character already knows how to use another artifact of the same class, and if the character has more "guts than sense," the character can take a chance and just try using the new artifact (see Immediate Use, below).

When there is no one available to teach the artifact's secrets, the more cautious or less hurried character will want to follow the process of investigation. Table 2: Artifact Complexity and Research Time, gives examples of how long the character must spend studying the artifact, based on its complexity (simple, intricate, abstruse, or gordian).

TABLE 2

Artifact Complexity and Research Time

| Complexity | Research Time |
| --- | --- |
| Simple | 5 - Int Mod minutes (minimum 1 full round) |
| Intricate | 5 - Int Mod hours (minimum 30 minutes) |
| Abstruse | 5 - Int Mod days (minimum 6 hours) |
| Gordian | 5 - Int Mod weeks (minimum 1 week) |

Thus, each artifact can include a complexity rating. To determine research time, one finds the appropriate row in Table 2, subtracts the character's Intelligence modifier (as defined the Player's Handbook) from 5 and uses the units appropriate to the complexity (minutes, hours, days, or weeks). If the character's Intelligence modifier is +5 or greater, use the listed minimum. Thus, if Nim has an Intelligence of 17 (modifier is +3), and is trying to master a new laser rifle, which has a complexity rating of intricate, it will take Nim 2 hours (5−3=2) to attempt to figure out exactly what it is and how it works.

Success or Failure: The Use Artifact Skill Check

In addition to the complexity rating, every artifact has an intrinsic DC. After spending the required time investigating the artifact, the character makes a Use Artifact skill check against the artifact's DC. If the character succeeds, after applying all applicable bonuses explained below, the character has mastered the artifact. The character now knows how to use it and may draw on any additional tactical information the character's player may know (in other words, the player may use all of her knowledge about the artifact when role playing her character).

The following modifiers in Table 3 may help the character comprehend the intricacies of the artifact and master its use:

TABLE 3

Use Artifact Modifiers

| Condition | Investigator's Use Artifact Modifier | Stack as . . . |
| --- | --- | --- |
| Already understands an artifact of same class | +4 | Familiar |
| Saw someone else use artifact briefly | +2 | Witness |
| Concentrated on someone else using artifact for 1 full round | +4 | Witness |
| Concentrated on someone else using artifact for multiple rounds | +6 | Witness |
| Immediate Use success | +5 | Experience |
| Previous Attempt or Immediate Use failure | +2 | Experience |
| Deciphered Directions to use artifact | +10 | Directions |
| Certain Psionic powers | see power | Psionic |

Multiple modifiers may apply and stack together, but only one of each type listed in the "Stack as . . . " column may be applied to a given Use Artifact skill check. Stacking refers to adding multiple bonuses. In general, only 1 bonus of a given type (as defined in "Table 3: Use Artifact Modifiers" by the "Stack as . . . " column) may be applied.

For example, Nim is investigating a laser rifle and trying to master its use. He has already mastered use of a shotgun and had carefully watched the enemy fire the laser rifle a couple of times. He also watched the enemy fire several other shots during their recent battle, but was not concentrating on those shots. Julie, the player who control's Nim, would add +4 (Already understands an artifact of same class—the shotgun, a familiar bonus) and +6 (Concentrated on someone else using artifact for multiple rounds, a witness bonus) for a total bonus of +10. Julie would not be allowed to add an additional +2 or +4 bonus for the other times Nim witnessed the laser rifle being used, because multiple witness bonuses do not stack.

Each condition has specific requirements in order to qualify for the bonus. The following are the descriptions of each possible bonus:

Already Understands an Artifact of the Same Class—

The character has mastery over an artifact of the same artifact class as the current item. This entitles the character to a +4 familiarity bonus with the new artifact. To have mastered another artifact, the character either must have succeeded at a Use Artifact check or have been taught its use by another. For example, if the current artifact is a shoulder arm class artifact (e.g., a laser rifle), and the character has previously succeeded at a Use Artifact check on another shoulder arm (e.g., a shotgun), the character gets the bonus. A successful Immediate Use does not confer this bonus.

Saw Someone Else Use Artifact Briefly—

The character was able to see another person successfully using the artifact or an exact duplicate. This does not require concentration, and it can be witnessed while performing another activity, including combat, but the character must be able to see the person using the artifact. If the field of view is obstructed or there is cover or a concealing fog or anything else that interferes with an unobstructed view, the character is not eligible for this bonus. Once a character has witnessed a successful use, he receives the +2 witness bonus on his Use Artifact check.

Concentrated on Someone Else Using Artifact for 1 Full Round—

The character spent one full round scrutinizing another person successfully using the artifact. If distracted in any way, the watching character must make a successful Concentration check, or only receive the benefit for briefly viewing another user (+2 witness bonus, instead of +4).

Special—For items that were activated before the viewing, like a force field raised before the character even saw the user, there is still a benefit from studying how it works, but this is only half the benefit, or +2.

For complex items that require multiple rounds to activate, the character only receives the full bonus if the character studies the entire process one full time. Otherwise, even if the character concentrates for a full round, the character only receives the brief observation witness bonus of +2.

Concentrated on Someone Else Using Artifact for Multiple Rounds—

The character successfully repeats concentrating on someone using the artifact in question. This repeat study need not immediately follow the first. There is no limit on how much time may pass between successful viewings. No additional bonuses accrue for successfully scrutinizing another person using the artifact more than twice. The maximum bonus a character can gain by simply watching others (witness bonus) is +6.

Special—For items that were activated before the viewing, like a force field raised before the character even saw the user, there is still a benefit from studying how it works for multiple rounds, but this is only half the benefit, or +3, no matter how long the character studies the item.

For complex items that require multiple rounds to activate, the character only receives the full bonus if the character studies the entire process multiple times. Otherwise, even if the character concentrates for two or more rounds, the character only receives the brief observation witness bonus of +2, or the concentrated single viewing witness bonus of +4.

Immediate Use Success—

If the character has already attempted to use the artifact using the rules for Immediate Use (see below) and succeeded, that fortuitous success goes a long way in helping the character understand the artifact. However, because the artifact was used in a haphazard and rushed manner, only partial insight is gained. The total experience bonus gained from a successful Immediate Use is +5. Additional Immediate Use successes do not add additional bonuses.

Previous Attempt or Immediate Use Failure—

While not as educational as a success, a character can learn from failures too. After attempting and failing a Use Artifact check for the artifact or failing an Immediate Use (see below), assuming the character is still eligible to use the device and has not destroyed it or killed himself, the character gains a +2 experience bonus to his subsequent attempts to master the artifact. Additional failures do not add additional bonuses.

Deciphered Directions to Use Artifact—

Occasionally there are instructions or directions that accompany an artifact. If these are complete and the character is able to read and understand them, (which may require its own separate Literacy skill check), the character receives a +10 directions bonus.

Psionic Powers—

Some psionic or other special powers give insight into an artifact's use.

As an example, following on from the earlier example with Julie playing the character of Nim, in the course of their adventure, Nim and his team engage a team of Baron Stalt's shock troops. One of the enemy warriors is wielding a laser rifle and shooting at Nim and his companions. Hoping to recover a new artifact, Nim studies the trooper firing the weapon. After Nim's side wins the battle, he recovers the artifact.

The game manager chooses to show Julie a picture of the laser rifle. Having the benefit of his descriptions of the holes it was burning in the targets during the battle combined with the picture he just showed her, Julie correctly recognizes it as a laser rifle. However, she knows that her character, Nim, still does not understand exactly what he has. After the party confirms the area is clear of enemies, she tells the game manager that Nim is going to try to figure out what his new artifact is and master its use.

Nim has a 12 ranks in Use Artifact. His Intelligence (as defined in the SRD) is 17 (mod +3). He has successfully figured out how to use other shoulder arms (+4 familiar bonus). He studied the enemy warriors using the artifact successfully more than once (+6 witness bonus). These figures add up to 25 (12+3+4+6=25). The DC for a laser rifle is 25. The game manager knows that no matter what Julie rolls, Nim will make the DC and succeed, but he doesn't tell her this. Julie rolls a d20, hoping to beat the needed DC. (Note: some game managers may prefer to perform these rolls for the players, but in general, allowing players to perform any roll where secrecy is not essential is preferred. Additionally, the Game Manager could manage these functions, which may or may not be secret, for the player or the game manager).

If Nim's Use Artifact skill were only 7, and everything else were the same, he would have a total modifier of 20 (7+3+4+6=20). Julie would have to roll a 5 or higher on the d20 to beat the 25 DC.

Many artifacts, including all firearms, grenades, and any items with a finite number of charges, consume either a charge, the whole grenade, or whatever unit is appropriate, in the act of experimentation and learning.

Taking 10 or Taking 20 (as Defined in the SRD)—

A player can take 10 on a Use Artifact check if there are no distractions. A player can never take 20 on a Use Artifact check.

Consequences for Failure—

Artifacts are dangerous to the users and to themselves. While studying an artifact and turning its dials, pushing its buttons, and adjusting its levers, a character can accidentally shoot himself, break the artifact, cause an explosion that kills everyone in the vicinity, or precipitate any other conceivable calamity.

Every artifact includes any number of possible exemplary failure consequences as part of its description. These are called, for example, minor, major, and catastrophic failures, however many other additional/alternative consequences could also be included. Whenever a Use Artifact DC check fails, the game manager consults Table 4: Artifact Use Consequences for Failure, to determine the outcome. The greater the difference between the Use Artifact check result and the artifact's DC, the worse the failure.

TABLE 4

Artifact Use Consequences for Failure

| Failed DC by | % Chance to Break | Consequence for failure | Time before next attempt | | | |
|---|---|---|---|---|---|---|
| | | | Simple | Intricate | Abstruse | Gordian |
| 1-2 | — | Marginal | 1 d 10 rounds | 1 d 12 minutes | 1 d 8 hours | 1 d 8 days |
| 3-5 | 20% | Minor | 1 d 8 minutes | 1 d 8 hours | 1 d 6 days | 1 d 6 weeks |
| 6-10 | 50% | Major | 1 d 6 hours | 1 d 6 days | 1 d 4 weeks + new level | 1 d 4 months + new level |
| 11+ | 80% | Catastrophic | 1 d 4 days | 1 d 4 weeks + new level | Beyond understanding | Beyond understanding |

Failure also guarantees that the character still does not understand how the artifact works. Depending on the artifact's complexity class (simple, intricate, abstruse, or gordian), as shown on Table 4, the character must wait between 1d10 rounds before making another attempt for a marginal failure with a simple artifact, to a catastrophic failure permanently precluding the use of an abstruse or gordian artifact.

If the character is allowed to make another attempt, after waiting the time specified in Table 4, the character must repeat the entire investigation period of Table 2 followed by another Use Artifact check. The character does receive a +2 experience bonus to this next Use Artifact check, based on what he learned from the first attempt. He does not gain additional bonuses from subsequent failures.

The character may still attempt to learn how to use different artifacts during the delay period associated with the failure. That delay only applies to the failed artifact and any functionally equivalent artifacts (e.g., if he failed with a laser rifle, he can't check again with another laser rifle).

Marginal Failure—Failed DC by 1-2—

If the DC is only missed by 1 or 2 points, this is a marginal failure and carries no consequences other than that the character still does not understand how the device works. Artifacts such as firearms, grenades, and any others with a finite number of charges still consume a charge, a shot, a whole grenade, or whatever unit is appropriate, simply for having made the attempt.

In addition, the character must wait before making another Use Artifact check for that particular artifact, as specified for the complexity class of the artifact in Table 4.

Minor Failure—Failed DC by 3-5—

If the DC is missed by 3-5 points, this yields a minor failure. A minor failure generally means the artifact's power is shorted or consumed, rendering the artifact functional, but powerless. See the artifact description for specifics. In addition to this damage, there is a 20% chance that the character has broken the artifact (see Broken Artifacts, below). The character must wait, as specified in Table 4, before attempting to use the artifact again. If the artifact has been rendered powerless, it will also need a new power source before the character can resume his study of it.

Major Failure—Failed DC by 6-10—

If the DC is missed by 6-10 points, the character has had a major failure. This generally means he has accidentally unleashed the power of the artifact in a harmful way on himself or someone nearby. There is also a 50% chance that the he has broken the artifact (see Broken Artifacts, below). The character must wait, as specified in Table 4, before attempting to use the artifact again. For artifacts with a complexity class of abstruse or gordian, the character may not attempt to use the artifact again until he has both waited the time required and gained a new level.

Catastrophic Failure—Failed DC by 11+—

If the DC is missed by 11 or more points, the attempt to use the artifact has resulted in a catastrophic failure. A catastrophic failure typically involves a power supply explosion or some other major event that harms everyone in the vicinity. The artifact is probably damaged by such a failure, with an 80% chance of being broken (see Broken Artifacts, below). The character must wait, as specified in Table 4, before attempting to use the artifact again. For artifacts with a complexity class of intricate, the character may not attempt to use the artifact again until he has both waited the time required and gained a new level.

For artifacts with a complexity class of abstruse or gordian, the artifact has proven too difficult. As a combination of the trauma of the catastrophe and the character's complete misunderstanding of the artifact, the character will never learn how to use it. The character may never make another attempt, nor is he eligible to learn its use from another.

Immediate Use: The Risky Guess—

As the enemy closes in, sometimes all a character can do is close their eyes, start pushing buttons, and hope for the best. This can help, or it can make matters, much, much worse.

If the character already knows how to use another artifact of the same class as the newly discovered artifact, if the artifact has power and is not broken, and if the character is not currently prohibited from making an attempt because of a previous failure, the character may attempt to use it without performing a full investigation.

"Immediate use" is a bit of a relative term. Table 5: Immediate Use, shows how "immediately" a character can begin using an artifact based on its complexity (simple, intricate, abstruse, or gordian).

More complex objects still take time to find the dials, buttons, switches, and so on. Immediately using an artifact like a rifle involves only finding the trigger. Flying a helicopter or using a CAT scan device requires identifying far more controls. This takes time, no matter how much of a rush the character is in.

TABLE 5

Immediate Use

| Complexity | Time needed for Immediate Use | Add to Artifact DC |
|---|---|---|
| Simple | 1 full round | 5 |
| Intricate | 2 full rounds | 10 |
| Abstruse | 30 seconds (5 rounds) | 15 |
| Gordian | 15 minutes | 30 |

Attempting immediate use of an artifact is risky. The likelihood of failure is much greater than if the character spends the ordinarily required time to learn how to use it. Similarly, the likelihood of damaging the artifact, the investigator, or any bystanders is also increased.

To determine success or failure, the game process is similar to an ordinary attempt to master an artifact: concentrate for the required time (using Table 5), then make a Use Artifact check including any applicable bonuses from Table 3. A successful check means the character succeeded in the one-time use. For example, one round in Table 5 equals six seconds.

Immediate Use Investigation Time—

The character must expend the time listed in Table 5 studying the artifact, finding the controls (some artifacts may require additional time, if so, this will be stated in the item's description). This study time requires the character's full attention and he cannot do anything else, except take a single standard 5' step per round. If events are distracting the character, he must make a Concentration check, as defined in the SRD, (DC based on the situation). Only rounds during which the character is not distracted count towards the total time needed. A failed Concentration check does not reset the time count, but it halts progress until the character is able to concentrate again, either because the source of the distraction is gone, or he succeeds at a subsequent Concentration check.

Use Artifact Check—

The Use Artifact check for Immediate Use is similar to a conventional Use Artifact check, except the DC is increased by the amount shown in Table 5.

After the character has focused his attention on the artifact for the time required by Table 5, he makes a Use Artifact check. The DC is the artifact's DC plus the corresponding "Add to Artifact DC" number also on Table 5, determined by the artifact's complexity. The bonus modifiers listed in Table 3: Use Artifact Modifiers, apply to the character's Use Artifact check, just as when investigating an artifact.

Success—

If the Use Artifact check succeeds, the artifact works correctly this one time. The character has NOT mastered use of the artifact and is not assured of using it correctly in the future. The success does grant a +5 experience bonus to all future Use Artifact checks with this artifact.

Failure—

The consequences for failure are determined in the same way as for a conventional Use Artifact check. Of course, the DC's are much higher as modified by Table 5. Find the amount of the DC failure on Table 4 and read across to the appropriate consequence. The "Time before next attempt" duration applies both to additional Immediate Uses and to standard mastery by investigation attempts.

Teaching Others—

Teaching requires a combination of knowledge with the ability to communicate that knowledge. Learning requires the intelligence to comprehend and the ability to question the teacher. Therefore both Intelligence and Charisma (two of the six core attributes in the SRD) are important attributes for teaching and learning how to use a new artifact.

Just as it takes time to learn how to use an artifact through investigation, it takes time to learn how to use an artifact from a teacher.

When a character is taught to use an artifact, success is guaranteed, provided the pupil has the capability to use the artifact at all (see Table 1: Requirements to Use an Artifact) and the artifact has power and is in working order.

Calculating the time the pupil and teacher must spend together is almost the same as for calculating the amount of study time needed when investigating an artifact. The major difference is the modifiers used.

TABLE 6

Teaching Time and Artifact Complexity

| Complexity | Time to Teach |
| --- | --- |
| Simple | 5 - Attribute Mod Sum* minutes (minimum 1 full round) |
| Intricate | 5 - Attribute Mod Sum* hours (minimum 30 minutes) |
| Abstruse | 5 - Attribute Mod Sum* days (minimum 6 hours) |
| Gordian | 5 - Attribute Mod Sum* weeks (minimum 1 week) |

*Attribute Mod Sum = Pupil's Int mod + Pupil's Cha mod + Teacher's Cha mod

To determine the time required for the teacher to teach the artifact's use, find the appropriate artifact complexity row in Table 6: Teaching Time and Artifact Complexity. Sum the pupil's Intelligence and Charisma modifiers and the teacher's Charisma modifier. Table 6 refers to this total as the Attribute Mod Sum. Subtract this Attribute Mod Sum from 5 and use the units appropriate to the complexity (minutes, hours, days, or weeks, as listed).

Repairing Broken Artifacts—

An artifact may be broken when found. A character can also break an artifact while attempting to learn how to use it. An artifact can also be broken if sundered by targeted attacks, just like any other item (see Sunder in the SRD).

There are 2 grades that describe how "broken" an artifact may be. An artifact may be broken or destroyed. When a working artifact breaks, it is considered broken. If a repair attempt fails, it may then progress to being destroyed (Table 8: Artifact Repair Results). A destroyed artifact can not be fixed. However, two identical destroyed artifacts may serve as component parts for certain characters with special artifact expertise to attempt to rebuild one of them.

TABLE 7

Artifact Repair Time

| Complexity | Repair Time |
| --- | --- |
| Simple | 5 - Int Mod minutes (minimum 1 full round) |
| Intricate | 5 - Int Mod hours (minimum 30 minutes) |
| Abstruse | 5 - Int Mod days (minimum 6 hours) |
| Gordian | 5 - Int Mod weeks (minimum 1 week) |

Repairing an artifact is similar to investigating how to use an artifact, but using the Repair Artifact skill instead of the Use Artifact skill and without all the modifiers. Only certain characters with special artifact expertise can repair artifacts of abstruse or Gordian complexity. The character attempting the repair must spend the time specified in Table 7: Artifact Repair Time, concentrating on the repair. The character then makes a Repair Artifact check. If the character succeeds, the character has repaired the artifact and restored it completely. If the character fails, consult Table 8 for consequences.

All times and attempts are per break, not per artifact. If someone else repairs the artifact and it breaks again before the "Time before next attempt" has passed, the first repairing character may immediately begin working on the new repair. Irreparable means that the character who failed is not able to find the problem and will never be able to fix that particular problem.

TABLE 8

Artifact Repair Results

| Failed DC by | % Chance to Destroy | Consequence for failure | Time before next attempt | | | |
|---|---|---|---|---|---|---|
| | | | Simple | Intricate | Abstruse | Gordian |
| 1-2 | — | Marginal | 1 d 10 rounds | 1 d 12 minutes | 1 d 8 hours | 1 d 8 days |
| 3-5 | 20% | Marginal | 1 d 8 minutes | 1 d 8 hours | 1 d 6 days | 1 d 6 weeks |
| 6-10 | 50% | Minor | 1 d 6 hours | 1 d 6 days | 1 d 4 weeks + new level | 1 d 4 months + new level |
| 11+ | 80% | Major | 1 d 4 days | 1 d 4 weeks + new level | Irreparable | Irreparable |

Alternative Methods for Use—

The same investigation technique could be used to solve in-game puzzles or diffuse traps. In-game puzzles refer to puzzles that a character solves in the game, as opposed to puzzles that the player figures out and then simply directs his character to carry out the steps. Investigation could be used by characters to understand magic items, technology, traps, devices, social problems, political puzzles, etc.

As a summary example of using this same method for social effects:

Change the "Use Artifact" skill in the previous example to an "Influence Others" statistic (skill or otherwise, the specific name used is not important). The time spent investigating the artifact, is instead time (or money or prestige points or any other vector) spent getting to know or seeking to persuade the target. After the time or points are spent, the character rolls the "Influence Others" check, with the DC set based on the difficulty of affecting the person (group, computer, etc.). If the check succeeds, the character has achieved his or her goal. If the check fails, the amount of the failure determines the severity of the consequences. For example, missing by 1-2 points could simply mean lack of success. Failure by 3-5 points could mean failure and no chance to try again. Failure by 6-10 points could indicate that the attempt so offended the target that the target will actively attempt to foil the efforts of the character. Failing by 11 or more points could mean, for example, that the target will attack or try to jail the character.

Continuing the Influence Others example, the complexity concepts listed under Use Artifact could be replaced by the social station of the target. This would reflect that it takes longer to establish rapport with someone who is protected by bodyguards or handmaidens than a typical person. Such divisions could be: common, aristocratic, famous and isolated. However, and in general, any number of divisions could be used.

Outlined below is one specific example of how interaction cards with transparent windows can be used to simulate interactions between items or objects. Similar to the rules for item identification, the interaction cards can also be used for a wide variety of applications, wherever interaction between items, objects, people, teams, etc., is involved.

The exemplary interaction cards could be used to keep track of money, or to simulate trade and economic effects. An educational application could teach economics by showing that different groups value different goods at varied amounts. Placing a goods card over a foreign country card (or game board) could reveal the relative value of that good to the country in question. Players could seek to sell goods to the countries that place the highest value on those goods. This same approach could be used to simulate any cultural effect.

Players could also use the interaction cards to simulate sports-based game play. The interaction cards could be used to show that some characters are better, for example, at tackling others in a football trading card game based on interactions between speed and weight represented by the cards. Baseball cards or other sports collectible/trading cards based on the interaction card configuration would also allow play of the virtual games against others.

The exemplary interaction cards could also be used to track health or injury in games involving combat. With only a slight variation from the examples herein, damage that certain weapons inflict could vary based on armor or other special items.

Interaction cards could be used to symbolize game characters themselves. Different races or classes or any other feature that could vary from one character to another could be modeled using the cards and demonstrate the varied interactions between certain items and particular characters.

In conjunction with the cards a rack (not illustrated) could be provided for holding the interaction cards such that other players only see the back of the cards, the same side the holding player sees prior to identifying the what the card represents. That way, other players never know exactly what the powers are of the holding player's cards until he plays them, but they still can see the general type of object (like knowing the player has a gun, but not knowing if its a laser or a pea shooter).

Figure 6:
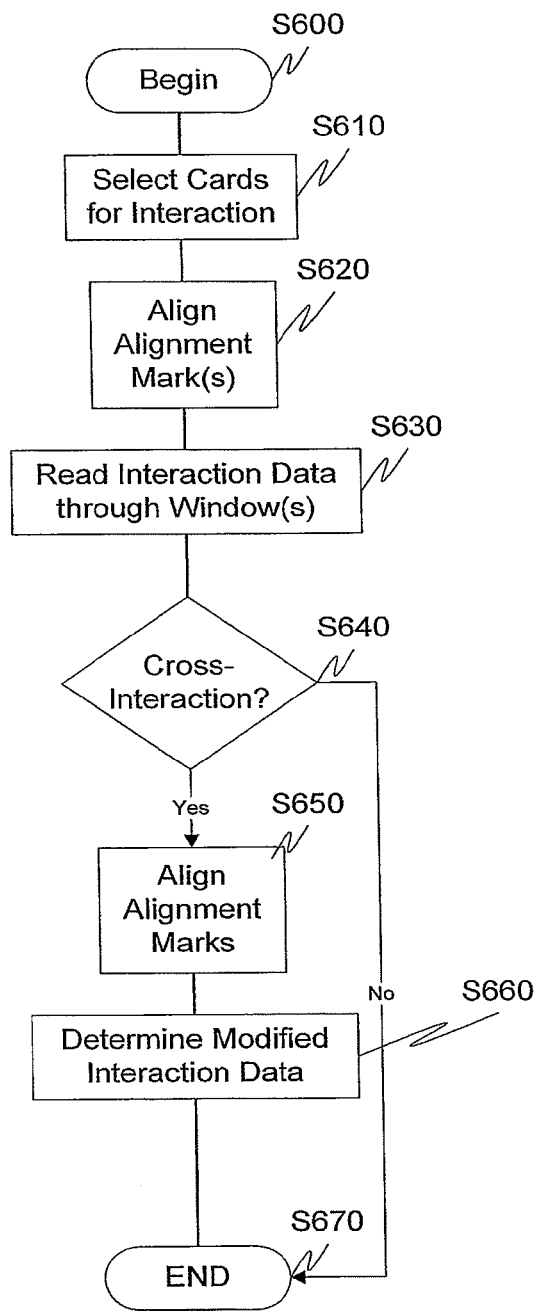
FIG. 6 outlines an exemplary method for interaction card interaction according to this invention.

FIG. 6 illustrates an exemplary methodology for card interaction. In particular, control begins in step S600 and continues to step S610. In step S610 one or more cards are selected for interaction. Next, in step S620, the one or more cards are aligned. Then, in step S630, the interaction data can be read through the window of the interaction card, for interaction cards that are placed one-on-top of another. Next, in step S640, a determination is made whether cross-interaction, as illustrated hereinafter, between one or more cards is desired. If cross-interaction is not desired or needed, control jumps to step S670 where the control sequence ends.

Otherwise, control continues to step S650 where the one or more interaction cards and cross-interaction cards are aligned. Then, in step S660, a determination is made as to whether the cross-interaction modifies the "base" interaction data on a primary interaction card. Control then continues to step S670 where the control sequence ends.

Figures 7, 8:
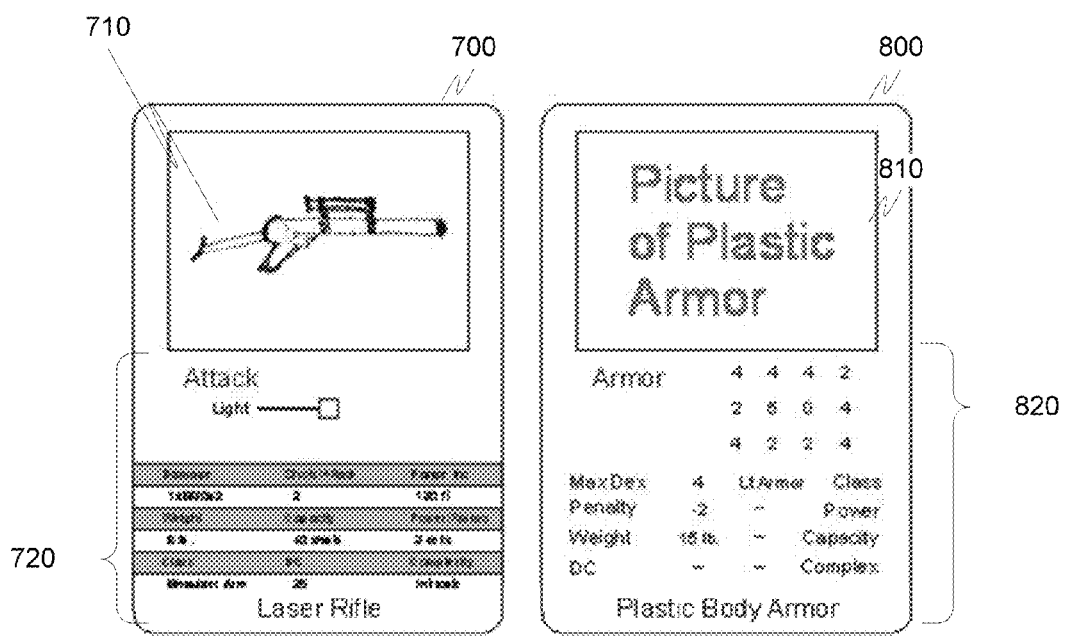
FIG. 7 outlines another exemplary embodiment of an interaction card according to this invention.
FIG. 8 illustrates an additional exemplary interaction card according to this invention.

FIG. 7 illustrates an exemplary interaction card 700 for an artifact 710, which in this case is a gun and various information 720 relating to either characteristics of the artifact and/or information used during game play. Similarly, the interaction card 800 in FIG. 8 includes a graphical representation of the artifact 810 as well as various information 820 relating to specifics about the artifact and information pertaining to the artifact's usage during game play.

FIG. 9 illustrates an exemplary interaction card 900. The interaction card 900 includes an object image area 910, which can include artifact information (not shown), an interaction data portion 920 and a window 930. Interaction data can be present in the interaction data portion 920 and can include one or more of graphical and numerical information as will be illustrated hereafter. During an interaction between the interaction card 900 and another interaction card, a portion of the interaction data from another card will be blocked with certain other content being visible through the window 930.

FIG. 10 illustrates an exemplary cross-interaction card 1000. The cross-interaction card 1000 comprises an interaction data portion 1010 as well as an area 1020 that illustrates exemplary information about the object to which the card relates. Within the interaction data portion 1010, cross-interaction data 1030 is illustratively shown. This cross-interaction data 1030 is used to modify base interaction data as discussed hereinafter.

FIG. 11 illustrates another exemplary interaction card 1100. The interaction card 1100 can include one or more portions 1110 where information about the object which the card represents can be placed as well as an interaction data portion 1120 that includes interaction data 1130.

FIG. 12 illustrates an exemplary set of interaction cards. In particular, the set includes interaction card 900, interaction card 1100, and cross-interaction card 1000. Thus, during game play, assume, for example, interaction card 900 represents a weapon, with interaction card 1100 representing a basic set of armor. To determine the effect the weapon will have on the armor, interaction card 900 is placed over interaction card 1100 with, in this case, the corners being aligned such that the interaction data portion of interaction card 1100 is overlapped by interaction card 900 with the base interaction data 1210 being visible through window 930 of interaction card 900. This base interaction data 1210 provides an indicator to the game players as to the type of interaction, such as damage, the weapon represented by interaction card 900 would have on the armor represented by interaction card 1100. The base interaction data could also be used to assist in determining the interaction, such as specifying the type of die to be rolled, a threshold to be satisfied, etc.

As discussed, this base interaction data 1210 can be modified, for example, and using the same simple illustration, if the player with the armor also has a shield, as represented by cross-interaction card 1000. Thus, to determine the interaction of all three objects, in this case the cross-interaction card 1000 is placed beside the interaction cards 900 and 1100 with the cross-interaction data portion 1010 aligned with the interaction data portion 920. With the cards being aligned, the base interaction data 1210 is then modified, by, in this case, a value of "0" which is the cross-interaction data 1030 that correlates to the same "category" of interaction data within interaction data portion 920 of interaction card 900. Thus, the total value of interaction for interaction cards 900, 1000, and 1100 is 5 with, in this case, the base interaction data 1210 being unmodified by the cross-interaction card 1000.

Figure 13:
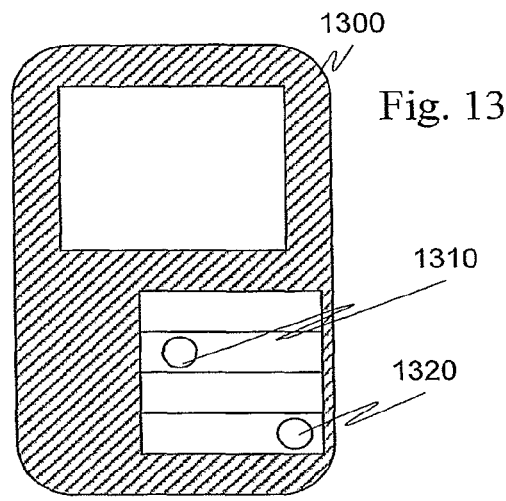
FIG. 13 illustrates another exemplary interaction card according to this invention.

FIG. 13 illustrates another exemplary embodiment of an interaction card 1300. In this exemplary embodiment, the interaction card 1300 includes a plurality of windows 1310 and 1320. In this case, for example, a player/game manager could choose which of the one or more windows would be used to determine the interaction.

While the exemplary windows in the various embodiments are shown to be circular and within the interaction data portion, it should be appreciated that the windows can be of any size, shape, or number and can be clear, or, for example, include a colored or polarized substrate, such as a cellophane, that controls by color, frequency of light, or polarization, what information passes through the card. Liquid crystal control could also allow for powered cards that include the ability to dynamically change based on, for example, the cards detection of the proximity of another adjacent card. Additionally, "secret" information can be imbedded in the interaction cards such that when two or more cards are overlaid in a particular orientation, information that may not be readily apparent when looking simply at one interaction card would be visible. For example, using well-known techniques and light filters, information can be printed on a first interaction card that only becomes visible when viewed by a player through a light filter, such as a window with colored cellophane. Additionally, instructions could indicate that if certain cards are aligned in a certain manner, the "secret" information would become visible. For example, if a weapon interaction card is placed over a shield interaction card to interact with the shield interaction card, first interaction data is revealed. However, if the weapon card is placed such that the "tip" of the weapon is over a chest area of the shield interaction card, different interaction data is revealed.

Optionally, the interaction cards can include a polarized filter so that turning the card or changing its angle changes what information is revealed from the card beneath it. The bottommost card may also reflect light in a polarized form, or have a secondary layer card in between cards that serves as the other polarizing filter—where it takes 2 to alter the color of the window.

A powered or passive liquid crystal filled window could also be used such that the window can dynamically change its transparency and polarization in response to external or interactive effects with other cards. For example, using magnets, RFID, electrical, capacitive, inductive or other means, identifying markers are embedded in the cards so that when placed near or atop one another, internal electronics can read the nearby card and cause a change in a liquid crystal filled window based on a recognition of the nearby card or formulae using data from both cards.

Figure 14:
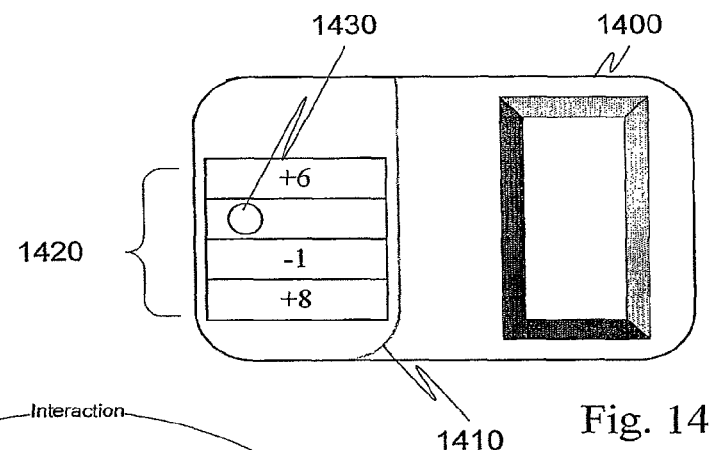
FIG. 14 illustrates an exemplary hybrid bonus interaction card according to this invention.

FIG. 14 illustrates an exemplary hybrid cross-interaction card 1400. This hybrid cross-interaction card includes an alignment mark 1410, which, in this illustrative example, represents the corner placement of another interaction card as well as an interaction data portion 1420 that includes interaction data (+6, −1, +8) as well as a window 1430.

Figure 15:
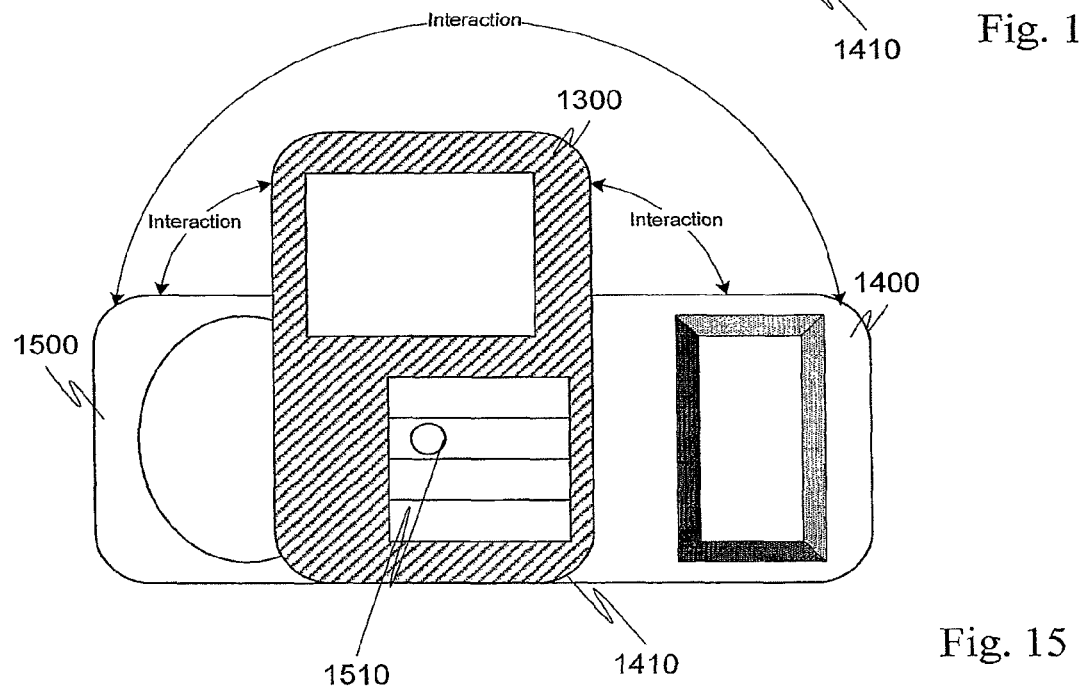
FIG. 15 illustrates exemplary interaction between a plurality of interaction cards and a hybrid cross-interaction card according to this invention.

Exemplary interaction of interaction cards 1300, 1400 and 1500 is seen in FIG. 15. In particular, in FIG. 15, three interaction cards have been stacked such that their interactive data portions are in alignment. In this particular example, interaction card 1500 is the base interaction card, with interaction card 1400 being stacked on top of interaction card 1500, and interaction card 1300 being placed on the top of the stack. Thus, since windows 1430 and 1510 are in alignment, through window 1510 interaction data (not shown) would be visible on interaction card 1500 that represents the interaction of the three interaction cards.

Figure 16:
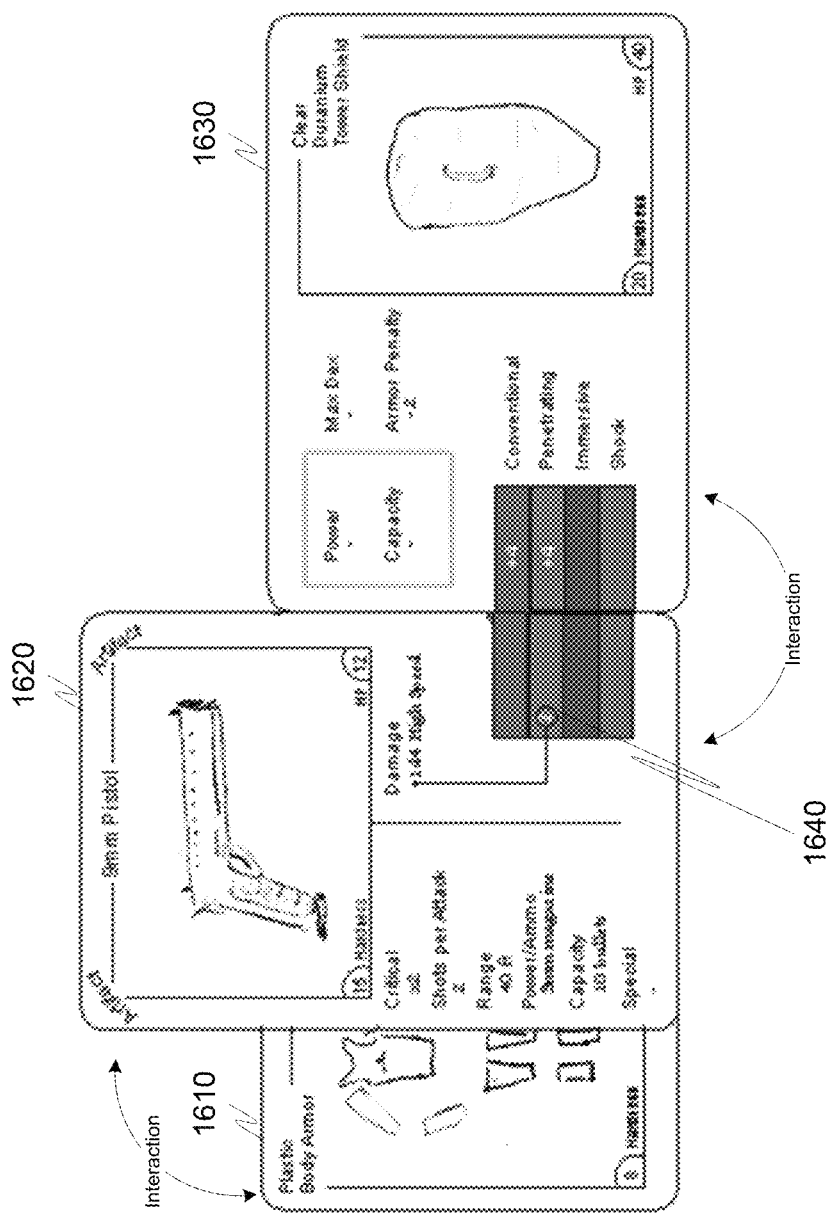
FIG. 16 illustrates exemplary interaction between real-world type artifacts and armor according to this invention.

FIG. 16 illustrates interaction between two interaction cards 1610, 1620 and a cross-interaction card 1630. These exemplary interaction cards include representations of objects and interaction data that could be used in a real-world gaming scenario. Thus, assuming these three cards were in use for interaction, interaction of interaction card 1610 and 1620 would reveal an interaction data value 1640 of "2" for the value of plastic armor against bullets from a 9 mm pistol (plastic armor is typically only modestly effective against bullets). However, when interaction card 1630 representing the metal shield is taken in to consideration as a cross-interaction, it is seen that a "bonus" value of +4 is added to the interaction data 1640. Thus, the summation of the interaction of the three cards would be an interaction data value of "6."

Figures 17, 18, 19:
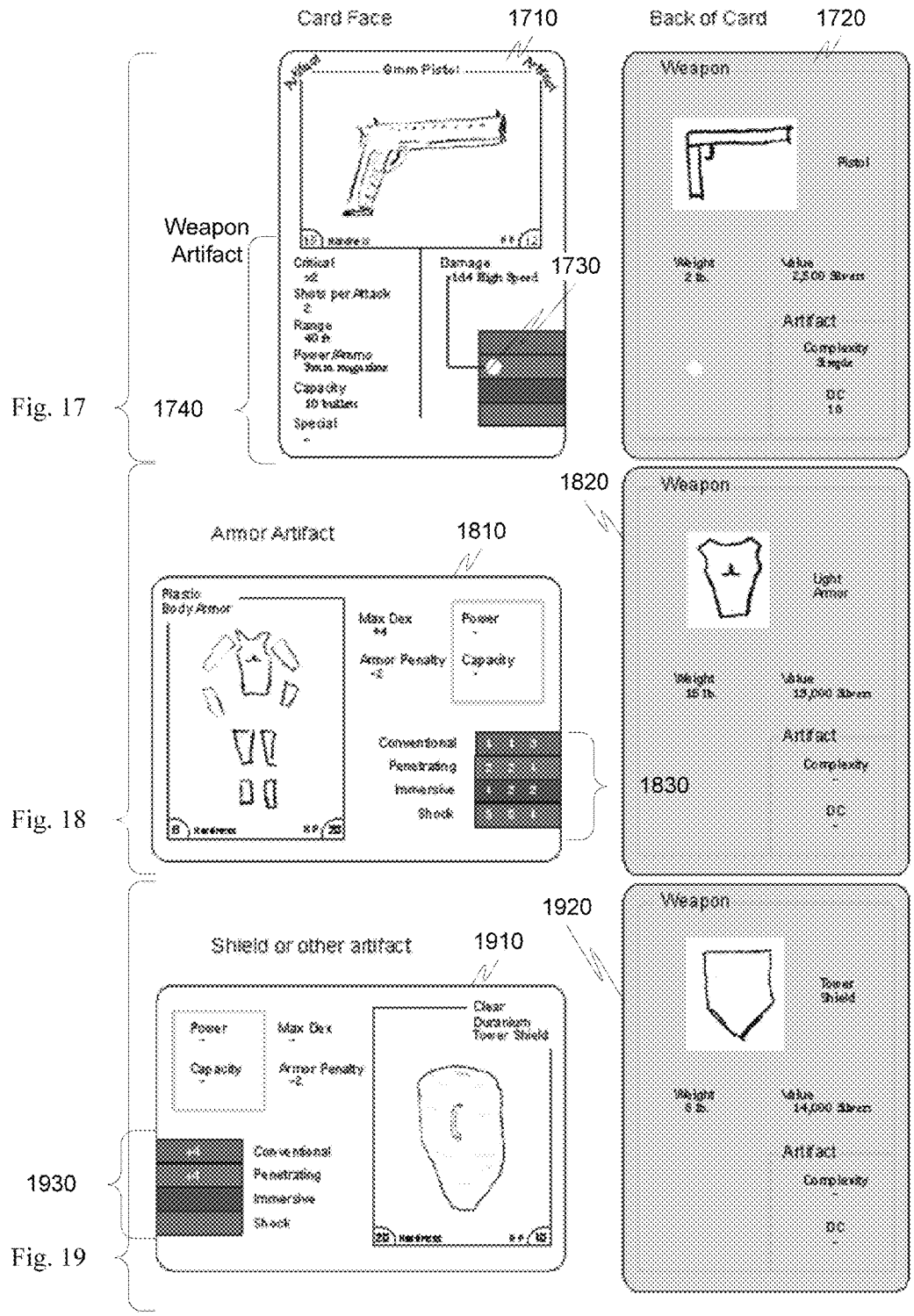
FIG. 17 illustrates an exemplary front and back view of a weapon artifact interaction card according to this invention.
FIG. 18 illustrates an exemplary front and back view of an armor artifact interaction card according to this invention.
FIG. 19 illustrates an exemplary front and back view of a shield or other artifact interaction card according to this invention.

FIGS. 17-19 illustrate exemplary front and back card faces of interaction cards. More particularly, in FIG. 17, a card face 1710 and card back 1720 are illustrated for a weapon, which is in this case, a 9 mm pistol. As previously discussed, the card back 1720 can have more limited information than what appears on the card face 1710. Also seen is the window 1730 which, in this illustrative example, would be used to give or determine the effectiveness of this weapon against targets wearing various types of armor (some armors block bullets well, others do not). Additionally, more detailed information 1740 can also be present on the card face 1710 as well as an image or drawing of the object.

FIG. 18 illustrates an exemplary card face 1810 and card back 1820. In this illustrative example, the object represented by the interaction card is armor with the card face 1810 including more detailed specifics about the armor than the card back 1820. In this illustrative exemplary embodiment, the interaction data portion 1830 is color coded, and includes four lines or categories of interaction data labeled "conventional," "penetrating," "immersive" and "shock." The high-speed bullets on the exemplary interaction card in FIG. 17 are one of 3 possible "penetrating" attack types. The other penetrating attack types in this example happen to be light (lasers) and acid. The interaction data value "4" in the right column of penetrating category would line up with the window from an acid attack because plastic armor defends well against acid attacks.

FIG. 19 illustrates an exemplary card face 1910 and card back 1920. This cross-interaction card includes interaction data in the "conventional" and "penetrating" portion of the cross-interaction data portion 1930, but does not include any cross-interaction information in the "immersive" or "shock" categories. In this particular case, the metal shield can block conventional (thrust, pierce, bash) and penetrating (high-speed, light, and acid splash), but not immersive and shock, because those affect the whole body (immersive) or use shock (metal is not shock resistant) so they go around or through the shield. As will be readily appreciated, any portion of the cross-interaction data portion 1930 can include or be absent of information, for example, based on what the interaction card represents and the intended interaction with other card(s).

While the exemplary embodiments illustrated herein show various configurations of interaction cards, interaction data, interaction data portions, window(s) and object types, it is to be appreciated that any aspect of the interaction card can be varied, for example, based on the particular operating or game play environment. Thus, the interaction cards can take on any shape, include one or more portions that are windows, these windows being capable of including a clear or colored substrate, with, for example, the capability of the cards being aligned in different orientations to reveal different interaction data.

For example, a first interaction card placed ninety degrees to a second interaction card could reveal a specific set of interaction data, while if the two cards are aligned in a forty-five degree relationship, a second piece of information data could be revealed. In general, any two or more cards, orientated in any two or three-dimensional orientation can be used and configured based on the general illustrative embodiments discussed herein.

Figure 20:
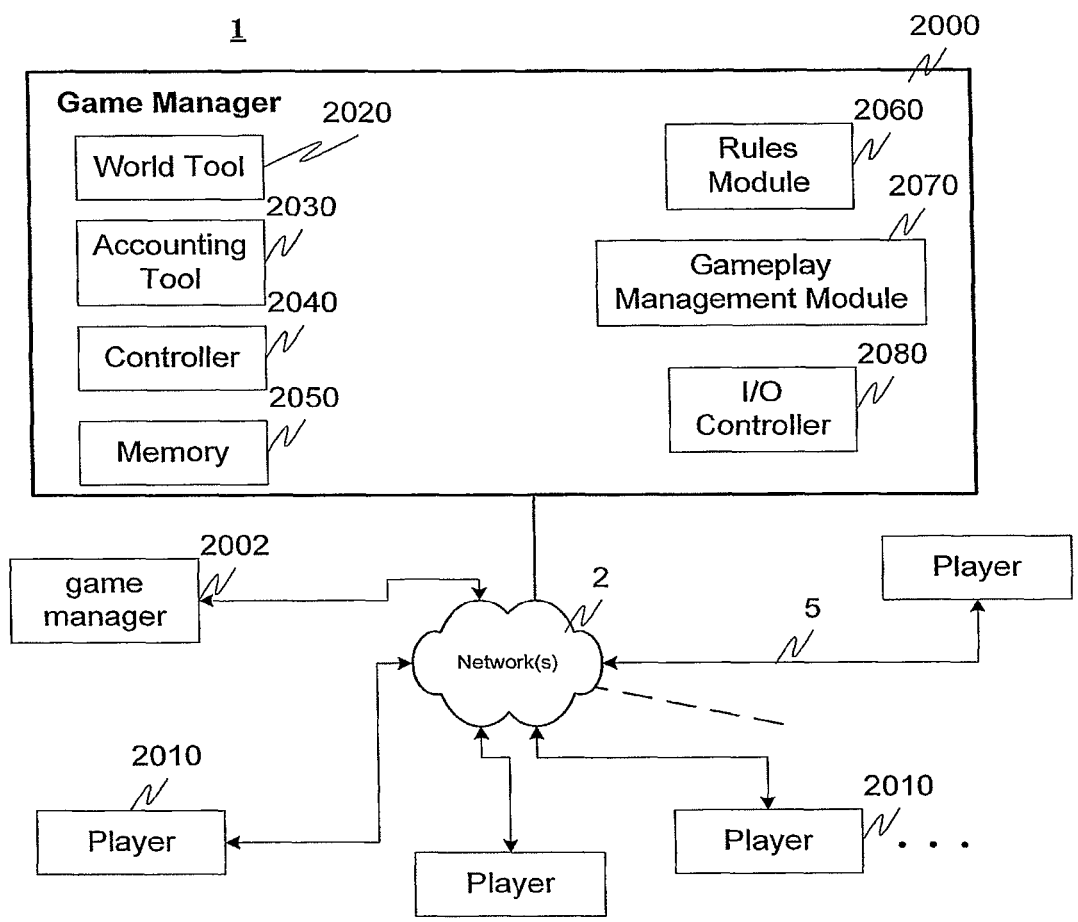
FIG. 20 illustrates an exemplary interactive gaming environment according to this invention.

FIG. 20 illustrates an exemplary interactive game environment 1. The interactive game environment 1 includes a Game Manager 2000, game manager(s) at one or more game manager stations 2002, one or more players at one or more player stations 2010 and a network 2, all interconnected by links 5.

The Game Manager 2000 includes a world tool 2020, an accounting tool 2030, a controller 2040, a memory 2050, a rules module 2060, a game play management module 2070, and an I/O controller 2080, all of which can be accessible to the game manager station 2002.

In operation, the Game Manager 2000 provides a control system for the game manager(s) at game manager station 2002. The Game Manager 2000 includes the necessary tools to customize the imaginary game world and the ability to maintain the imaginary world in real-time with other players playing the game. The game manager, interfacing with the Game Manager 2000, has the capability of monitoring, managing, modifying, creating or deleting any aspect of the game as well as managing non-player characters in the game. For example, the Game Manager 2000 can be provided in a network-based environment with various players connection through player stations 2010 connecting to the Game Manager 2000 for game play.

The Game Manager 2000 has three exemplary modes of operation: setup, play and management. Before game play can occur, the game needs to be setup, worlds created, and basic rules established that regulate game play in the virtual environment. Thus, in cooperation with the world tool 2020, controller 2040, memory 2050 and I/O controller 2080, the game manager renders the virtual world in which the game will be played. This can allow the game manager to create such things as towns, ruins, creatures, objects, or in general add or modify any aspect of the virtual world. These aspects can be created from scratch or based, for example, on a template. The template could include, for example, a basic set of information about the game play environment or, for example, a complete game play environment such as a complete world. In addition, and with the cooperation of the accounting tool 2030, the game manager can establish user accounts that allow for the facilitation of billing and player management.

During game play, and in cooperation with the game play management module 2070, the game manager runs the Game Manager 2000 in play mode. In this mode, the game manager interacts with the other players in real-time or, for example, in a phased, turn-based system. During this mode, at least all of the actions listed below are capable of being used within the game play environment for interaction and communication between the players and the game manager running the Game Manager 2000.

For example, the Game Manager 2000, can provide the game manager an overview map that shows where all the characters, creatures and objects are in the virtual environment. The game manager also has the ability to click-to-select any non-player character or object in the world and manage its behavior. In addition, controls, such as slider controls, could be provided that allow for the control of weather, random creature creation, non-player character and creature aggressiveness/hostility toward the player characters, treasure value, difficulty class (DC) ratings, or in general, any aspect of the virtual game play world.

Moreover, the game manager can be given the ability to select any creature and increase or decrease its challenge rating, with the software automatically changing the challenge to suit the selected challenge rating. Objects can be placed at any location by the game manager including associating the object with non-player characters in real-time. Objects and artifacts can also be created and defined by the game manager, as well as triggers that, when satisfied, trigger an in-game event automatically.

Furthermore, various interactions between player characters, non-player characters, and objects can be highlighted for the game manager using the Game Manager 2000 thereby allowing the game manager to participate and interact with the action. Furthermore, an alert can be sent to the game manager whenever a player character is "spotted" "heard" or otherwise noticed by a non-player character or creature who is not considered a standard townsperson (a townsperson does not react to scene player characters, but a wanderer or a hungry wolf might) with an option to take instant control of that non-player character. The game manager can also set inclination toward player characters, which establishes like/dislike attitudes, which in turn can cause different alerts back to the game manager or automatic reactions on the part of the non-player characters. Any aspect of the gaming environment can be overridden by the game manager as well as the ability provided to change the time of day or season within the game, either by advancing time, character age, or the like, or by introducing a "time warp" period.

The game manager is also able to associate non-player characters so they begin to travel together automatically, in groups, with the ability to disassociate them at a later time, for example, based on a trigger. Other facilities, for enabling the game manager to have control over the game world can also be included with no limit to the diversity, complexity, or simplicity of the control as provided by the Game Manager 2000. The game manager also has the capability of interacting with a player character to determine the specifics about the player character, such as health, stamina, objects in the player character's possession, or the like. The various players at player stations 2010 could also log on to the Game Manager 2000 and, for example, in cooperation with game play management module 2070, edit one or more aspects of their stored character(s).

Communication between the Game Manager 2000 and the various players at player stations 2010 could also be enhanced to include audio and/or video data to allow communication between the game manager and the various players and also the option of introducing, for example, effects (text and/or sound) and/or video clips corresponding to particular events occurring within the game play world. Game Manager 2000 could also allow various players to communicate directly with one another through one or more of audio and/or video communication means as well as through traditional text-based messaging systems. The game manager further has the ability to control start-up and stopping of the game, which can be important for the narration and background in relating all the interesting details that can be shown using preprogrammed-computer graphics and sounds, like facial expressions, smells, or something odd, meant to serve as a clue to the player characters. Additionally, numerous different selectable views can be made available to the various players and game manager such as 3-D, 2-D, first person, third person, aerial view, tactical view, and the like. This can be automatic or, can occur any time a desired change in perspective is requested.

The Game Manager 2000 can also include a player finding system where players are referred to game managers, for example, based on a communications network, such as an e-mail or bulletin board message system. New players can then sign-up and create an account with the Game Manager 2000. Furthermore, the Game Manager 2000 can be auto-updated, can include version migration, can host tournaments, and include the ability to move players from one game manager managed session to another session run by, for example, a different game manager. Furthermore, numerous games could be merged onto and played on a single Game Manager 2000.

In an alternative exemplary embodiment, and in a manner similar to utilizing the Game Manager 2000 to coordinate, manage and monitor role-playing games, the interactive game environment 1 can be used, for example, for virtual sports play. This would operate in a manner similar to the role-playing gaming environment with players able to, for example, assume the roles of team members/athletes. Appropriate controls can then be provided to the game manager that correspond to the game environment, such as weather, stadium noise, etc.

A peer-to-peer economic model can be used where an individual person acting as the game manager can control and accept the incoming players, and if the game manager charges the player(s), that can be performed in conjunction with the Game Manager 2000. A client-server model could also be utilized where the game manager logs onto a centralized Game Manager 2000 to create the imaginary world with players connecting as discussed. In this example, both game managers and players could be charged for using a Game Manager.

An alternative gaming model could include licensing individual game managers a copy of game manager software. The game managers would then find players to play player characters in a virtual world controlled through the Game Manager. Players would then be charged to play, with, for example, a portion of the payment being collected by a license holder. Optionally, the game manager could be allowed to set the price for the players to play, with a percentage or a fixed fee per player or a combination thereof held by the entity owning the Game Manager system.

Yet another alternative gaming model could include renting individual game managers the Game Manager. Game managers would then find players to play player characters in a virtual world controlled through the Game Manage. Players could then be charged to play, with payment being collected by the individual game managers.

Another alternative gaming model could include renting individual game managers "game space" on a Game Manager. Game managers would then find players to play player characters in their virtual world which would be controlled through the Game Manager. Players could then be charged to play, with payment being shared by the individual game managers and an entity owning the Game Manager.

Information storage media including the Game Manager could also be sold or given away to game managers, who in turn find players. The game managers could then be allowed to play, for example, for free on a large host server having built-in accounting functionality managed by a controlling entity. This type of configuration would make it easy for the game manager to charge his/her players. The controlling entity could then share the generated revenue with the game manager.

In general, any revenue generation/sharing model could be used in conjunction with the interactive gaming environment.

While exemplary operational embodiments have been discussed herein relating to a role-playing type scenarios and a sports-play type scenarios, it should be appreciated that any type of scenario could utilize the benefits and advantages of the Game Manager 2000 including, but not limited to, military applications, strategy applications, teaching applications, recreational applications, and the like.

The described systems and methods can be implemented on one or more gaming machines, or the like, or on a separate programmed general purpose computer. Additionally, the systems and methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the flowcharts illustrated herein can be used to implement the system according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The systems and methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general purpose computer, a special purpose computer, a microprocessor, or the like. In these instances, the systems and methods of this invention can be implemented as program embedded on personal computer such as JAVA® or CGI script, as a resource residing on a server or graphics workstation, as a routine embedded in a dedicated gaming system, as a plug-in, or the like. The system can also be implemented by physically incorporating the system and method into a software and/or hardware system, such as the hardware and software systems of a gaming/learning/strategy/military, or the like system.

While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. An attack and defend interaction card system comprising:
   an attack card comprising:
      an illustration of an attack object;
      a quantity of interaction data having data values of the attack object; and
      at least one window positioned through the attack card; and
   a defend card comprising:
      an illustration of a defending object; and
      a quantity of interaction data having a plurality of data values of the defending object, wherein the plurality of data values are spatially arranged on a surface of the defend card; and
   an interaction card comprising an interaction data portion having a quantity of numerical cross-interaction data;
   wherein the attack card is stacked on top of the defend card, wherein at least one of the data values of the defend card is visible through the at least one window of the attack card, and wherein the interaction card is positioned beside the stacked attack and defend cards, wherein the numerical cross-interaction data is in alignment with the at least one data value of the defend card and the at least one window of the attack card.

2. The attack and defend interaction card system of claim 1, wherein the plurality of data values are spatially arranged in a grid on the surface of the defend card.

3. The attack and defend interaction card system of claim 1, wherein the plurality of data values are spatially arranged randomly on the surface of the defend card.

4. The attack and defend interaction card system of claim 1, wherein the defend card and the interaction card are positioned in linear alignment, and wherein the attack card is positioned substantially perpendicular to the defend card and the interaction card.

* * * * *